(No Model.)

A. W. MARSHALL.
MACHINE FOR FREEZING CREAM, &c.

No. 320,572. Patented June 23, 1885.

Witnesses
Chas. H. Smith
J. Staib

Inventor
Alfred W. Marshall
per Lemuel W. Serrell
atty

UNITED STATES PATENT OFFICE.

ALFRED WILLIAM MARSHALL, OF MORTIMER STREET, CAVENDISH SQUARE, COUNTY OF MIDDLESEX, ENGLAND.

MACHINE FOR FREEZING CREAM, &c.

SPECIFICATION forming part of Letters Patent No. 320,572, dated June 23, 1885.

Application filed April 20, 1885. (No model.) Patented in England February 7, 1884, No. 2,911.

*To all whom it may concern:*

Be it known that I, ALFRED WILLIAM MARSHALL, subject of the Queen of Great Britain, residing at Mortimer Street, Cavendish Square, in the county of Middlesex, England, have invented certain new and useful Improvements in Machines for Freezing Cream, &c., of which the following is a specification.

Machines constructed according to this invention are, primarily, intended for domestic use, the object being to save time, labor, and freezing material; and to simplify the construction and use of such machines, I construct the machine in such manner that the freezing pan or vessel containing the material to be frozen turns upon a central upright pivot which is fixed to the bottom of the tub containing the freezing-mixture, and so that the freezing action, by preference, wholly or principally takes place from below, the freezing-pan being of large diameter and shallow; also in such manner that the said pan can be easily removed and replaced; and so, also, that the state of the contents can be examined at a glance.

Figure 1:
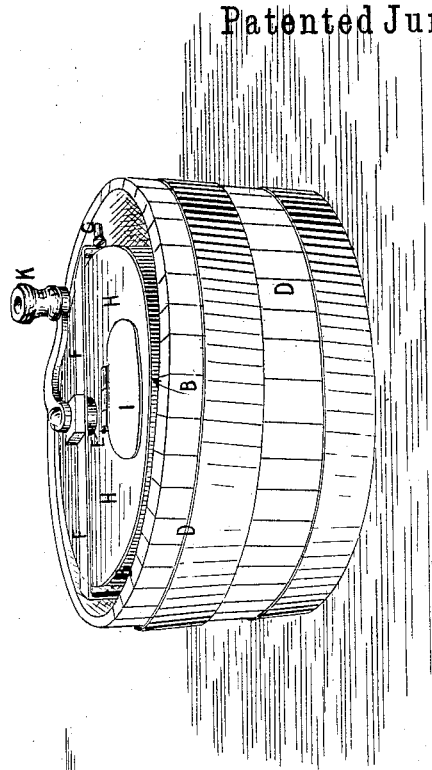
Figure 2:
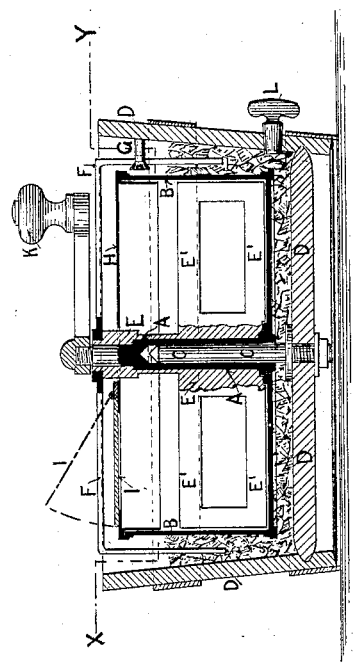
Figure 3:
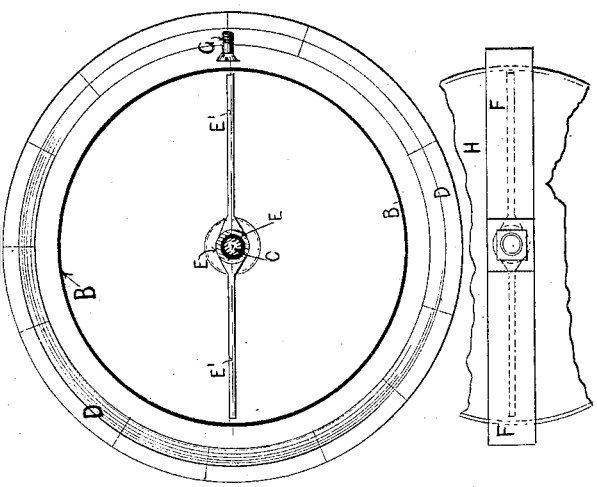
Figure 4:
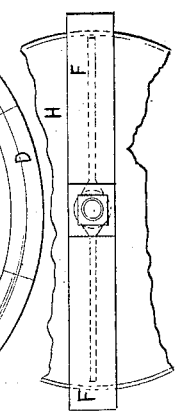

Figure 1 is a perspective view of an apparatus constructed according to my invention; Fig. 2, a vertical cross-section; Fig. 3, a horizontal section on line X Y of Fig. 2, and Fig. 4 a part plan of a portion of apparatus A hollow spindle, A, is fixed centrally in the bottom of the freezing-pan, B, and C is a pivot fixed centrally in the bottom of the tub D, and the hollow spindle A turns freely on said pivot. The freezing-mixture is placed in the tub D, under the bottom of the pan B, and said pan can rise and fall on the pivot, as required, according to the amount of freezing-mixture desired to be placed in the tub D. The said hollow spindle A, with the pan B, is free to turn in the mixer sleeve or boss E, which is held in place by being formed with a square or flats at the top, (see Figs. 2 and 4,) on which square is fitted a corresponding square hole formed in a cross-bar, F, which fits easily in or on the upper part of the tub, and is prevented from turning therein by a peg, G, or other stop in or on the tub D. The pan B is provided with a loosely-fitting lid, H, having a smaller lid I, which on being raised or removed admits of ready inspection of the contents during the operation of freezing. The pan B is turned by means of a handle, K, fitting on the top of the aforesaid hollow spindle A. The mixer-arms E, being held at rest by the cross-bar F, scrape off the frozen layer which forms on the cold metal surface of the pan B, thus doing away with the use of a spatula for that purpose and preventing also the formation of unevenly formed or frozen parts of the cream. The mixer E E' is prevented from rising by means of the screwed-on handle K. The position of the mixer-sleeve E and arms E' can, if desired, be made so as to be adjusted vertically by means of a nut.

L is a plug which may be fitted for draining the tub. Although I find it most convenient to employ freezing-mixture under the bottom of the pan only, requiring no packing or use of spatula, I may, of course, if desired, pack it around the pan also. The mode of using it is very simple. Some ice and salt is thrown in the bottom of the tub D, and some cream or other mixture into the pan B; then turn the handle for a few minutes, and the cream or other mixture is frozen.

The state of the contents of the pan B can be ascertained from time to time by opening the lid I.

The whole operation is convenient, quick, and clean.

I claim—

1. A freezing-machine consisting of a tub with fixed central pivot on which the central hollow spindle of the pan can turn freely, the boss or sleeve of the mixer being mounted freely on the said hollow spindle and provided with a bar which comes against a stop in or on the tub, substantially as described.

2. A freezing-machine consisting of a shallow tub, D, with fixed central pivot, C, on which the central hollow spindle, A, on the pan B can be turned freely by handle K, the sleeve or boss E of the mixer being mounted freely on the spindle A, and provided with cross-bar F, which comes against a stop, G, in or on the tub, substantially as shown on the drawings.

ALFRED WILLIAM MARSHALL.

Witnesses:
 JNO DEAN,
 WALTER JAMES S. RERTEN,
*Both of 17 Gracechurch Street, London.*